United States Patent [19]

Peters

[11] Patent Number: 5,028,875
[45] Date of Patent: Jul. 2, 1991

[54] LINEAR ROTARY DIFFERENTIAL CAPACITANCE TRANSDUCER

[75] Inventor: Randall D. Peters, Lubbock, Tex.

[73] Assignee: Texas Tech University, Lubbock, Tex.

[21] Appl. No.: 344,209

[22] Filed: Apr. 27, 1989

[51] Int. Cl.$^5$ .......................................... G01R 27/26
[52] U.S. Cl. ................................. 324/660; 324/679; 340/870.37
[58] Field of Search ............... 324/660, 658, 680, 679, 324/686, 690, 687, 725; 340/870.37

[56] References Cited

U.S. PATENT DOCUMENTS

| | | |
|---|---|---|
| 3,121,839 | 2/1964 | Malenick et al. . |
| 3,198,937 | 8/1965 | Wooster . |
| 3,296,522 | 1/1967 | Wolfendale . |
| 3,337,789 | 8/1967 | Ono et al. .................. 340/870.37 X |
| 3,729,991 | 5/1973 | Hardway, Jr. . |
| 3,732,553 | 5/1973 | Hardway, Jr. . |
| 3,845,377 | 10/1974 | Shimotori . |
| 3,938,113 | 2/1976 | Dobson et al. .................. 340/870.37 |
| 4,023,413 | 5/1977 | Stauber . |
| 4,092,579 | 5/1978 | Weit . |
| 4,439,725 | 3/1984 | Ogasawara . |
| 4,720,698 | 1/1988 | Brooke et al. . |
| 4,755,731 | 7/1988 | Anthony et al. ............... 324/660 X |
| 4,788,546 | 11/1988 | Sasaki . |

OTHER PUBLICATIONS

Stefanides, E. J., "Inductive Sensors Improve Automotive Position Sensing", Design News, pp. 256–257 (Oct. 3, 1988).
Jones, B. E., "Simple Capacitance Transducer for Instantaneous Angular-Velocity Measurement", Electronics Letters 6(20): 651–652 (Oct. 1, 1970).
Stacey, F. D., et al., "Displacement and Tilt Transducers 140 dB Range", Journal of Scientific Instruments 2(2): 945, (12/1969).
Makow, D., "A New Stable Capacitor and Its Application to the Measurement of Angle", Radio Science 6(1):1–5 (Jan. 1971).
Smirnov, M. V., et al., "Capacitive Transducer of Torsional Oscillations for Oscillation-Type Viscosimeters (Exchange of Experience)", Institute of Electrochemistry of the Urals Scientific Center, Academy of Sciences of the U.S.S.R., translated from Zavodskaya Laboratoriya 45(5):442 (May 1979).
Winkler, L. I., "Measurement of Small Electrical Forces Using a Torsion Balance and Capacitive Position Transducer", Rev. Sci. Instrum. 57(12):3019–3023 (Dec. 1986).

Primary Examiner—Kenneth Wieder
Assistant Examiner—Robert W. Mueller
Attorney, Agent, or Firm—Cox & Smith

[57] ABSTRACT

A bridge-type capacitance transducer is disclosed. The transducer utilizes a coaxially mounted circular stator and circular rotor to form the capacitance bridge. An excitation voltage is applied to the bridge. The output voltage of the bridge is conditioned by synchronous detection so as to yield a signal proportional to the degree of rotation of the rotor.

4 Claims, 5 Drawing Sheets

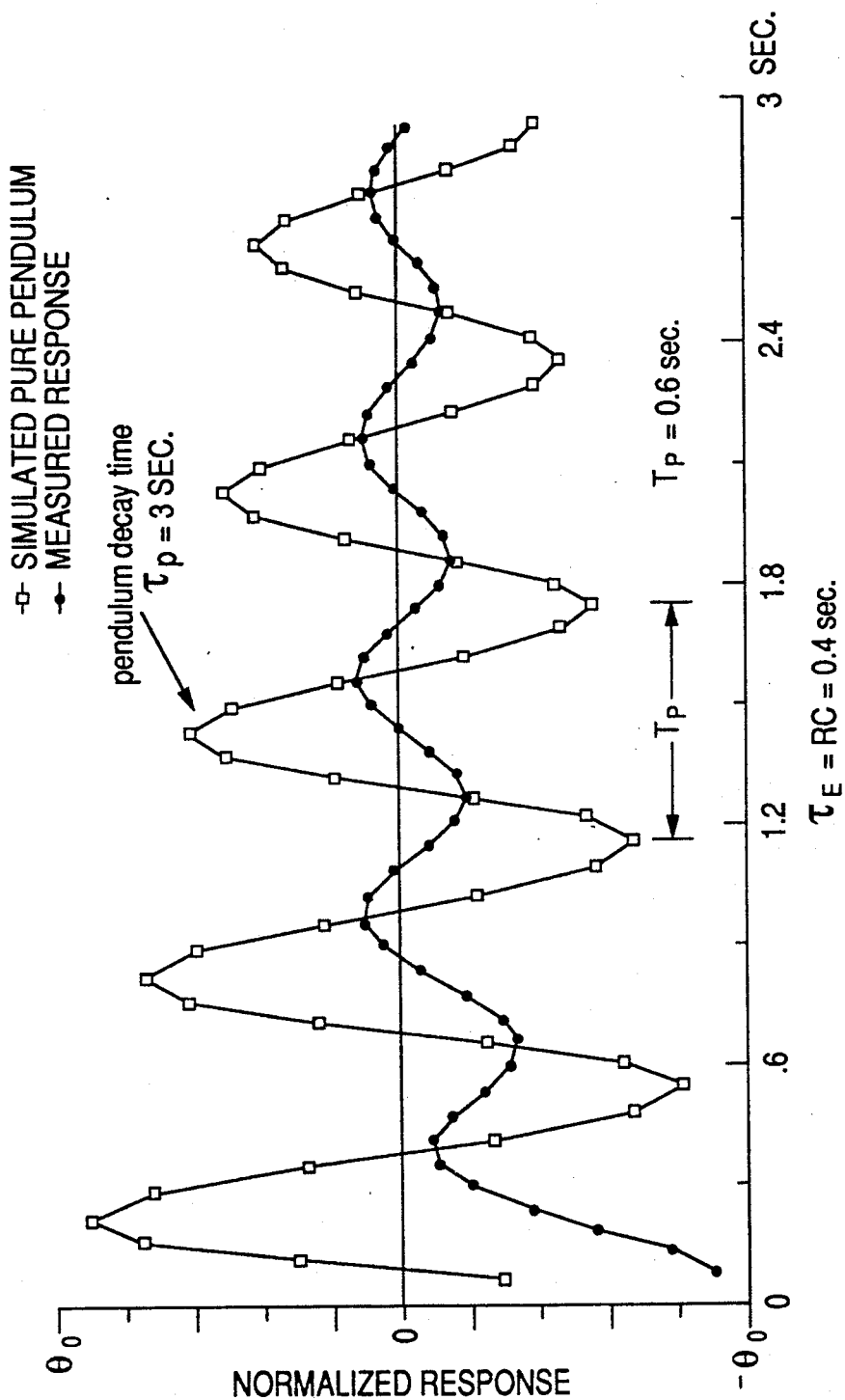

LINEAR ROTARY DIFFERENTIAL CAPACITANCE TRANSDUCER

STATEMENT OF GOVERNMENT INTEREST

This invention was made with Government support under contract number F49620-85-C-0013/SB5851-0630 awarded by the Air Force. The Government has certain rights in this invention.

BACKGROUND

Capccitance transducers of varying types have been used extensively to sense rotation. Most of the capacitance transducers which appear in the prior art, however, do not possess sufficient linearity or sensitivity to be useful in a variety of engineering applications. Furthermore, motion transducers necessarily have moving parts, and the attachment of wire leads to the moving part of the transducer can result in undesirable damping.

It is, therefore, an object of the present invention to provide a capacitance transducer for sensing rotary motion with a high degree of sensitivity.

It is a further object to provide a rotary motion transducer with a very linear transfer function.

It is a still further object to provide a rotary motion transducer in which no wire leads are connected to the moving part of the transducer.

SUMMARY OF THE INVENTION

The transducer according to the present invention is a bridge-type capacitance transducer. A circular stator consisting of two semicircular conductive plates separated by an insulating strip is aligned in parallel with a similarly constructed rotor. The rotor and stator are mounted coaxially so as to be separated by a constant spacing. The rotor is attached to a member which experiences rotation relative to a rigid frame while the stator is nonrotatably attached to the frame. A bridge excitation voltage is applied across the two semicircular plates of the stator. The impedance seen by the excitation voltage thus consists of four parallel plate capacitances in a bridge type configuration which vary as the rotor is rotated. The potential difference between the semicircular plates of the rotor is conditioned through synchronous detection to yield an electrical signal which is linearly related to the degree of rotation experienced by the rotor. In order to eliminate the need for wire leads to measure the potential difference, a coaxially mounted capacitance pick-up plate comprising two conductors is employed.

BRIEF DESCRIPTION OF THE DRAWINGS

FIG. 5 shows the results of a test conducted with a torsional pendulum.

DETAILED DESCRIPTION OF THE INVENTION

Figure 1:
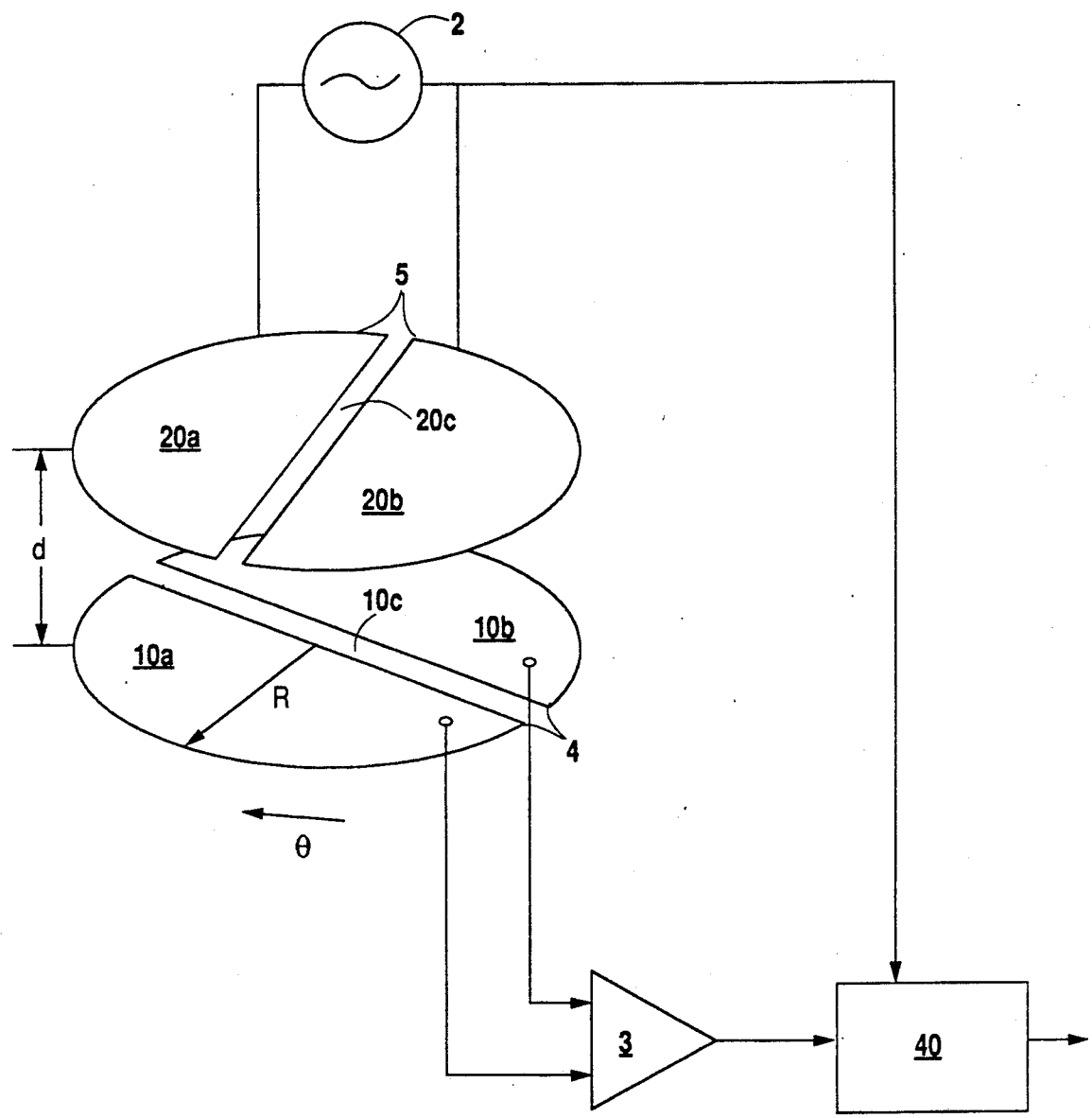
FIG. 1 is a schematic of the basic transducer without pick-up plate in accordance with the present invention.

The basic transducer (without capacitance pick-ups) is illustrated in FIG. 1. It comprises a parallel plate capacitor of constant spacing, d, formed of circular plates of equal size divided along a diameter. One pair of the resulting two pair set of semicircular plates becomes the rotor 4 and the other pair becomes the stator 5. As shown in FIG. 1, the rotor 4 comPrises two semicircular plates 10a and 10b separated by an insulating strip 10c along the diameter. Stator 5 is similarly constructed of semicircular plates 20a and 20b separated by insulating strip 20c. The stator and rotor thereby form a bridge-type capacitance network made up of four capacitances which vary as the rotor is rotated. A bridge excitation source 2 applies A.C. voltage across stator plates 20a and 20b. The voltage difference between rotor plates 10a and 10b is then sensed by a differential amplifier 3 whose output is connected to the input of synchronous detector (lock-in amplifier) 40. A representative synchronous detector of the type used in the present invention is a Model 121 manufactured by Princeton Applied Research of Princeton, N.J. The reference signal to the synchronous detector is obtained from the bridge source 2. The output from the synchronous detector is a voltage which is proportional to the degree of rotation of the rotor.

The nominal zero displacement (equilibrium) position of rotor 4 and stator 5 is one in which the insulating strips of the two are perpendicular to each other. In the usual application for sensing rotational displacement, the rotor is attached to a member which experiences rotation relative to a rigid frame. The stator 5 is attached to the frame. For greatest linearity and sensitivity, it is important that the plates be maintained parallel, and that the separation between the plates, d, be small compared with the radius of the plates R. In the figure, the source of bridge excitation 2 is applied across the rotor segments, and the output is detected across the stator segments. If the wire attachments or brushes can be tolerated for the particular application, the system will function with the connections interchanged; i.e., drive to stator 5 and output from rotor 4. The bridge source emf is typically in the neighborhood of 6 to 65 volts rms. It will be shown later, however, that there is an electrical torque which tends to restore the system to the nominal position. The restoring constant is proportional to the mean square voltage of the source, and so some applications may want to work with voltages outside the 6-65 volt range indicated.

Figure 2:
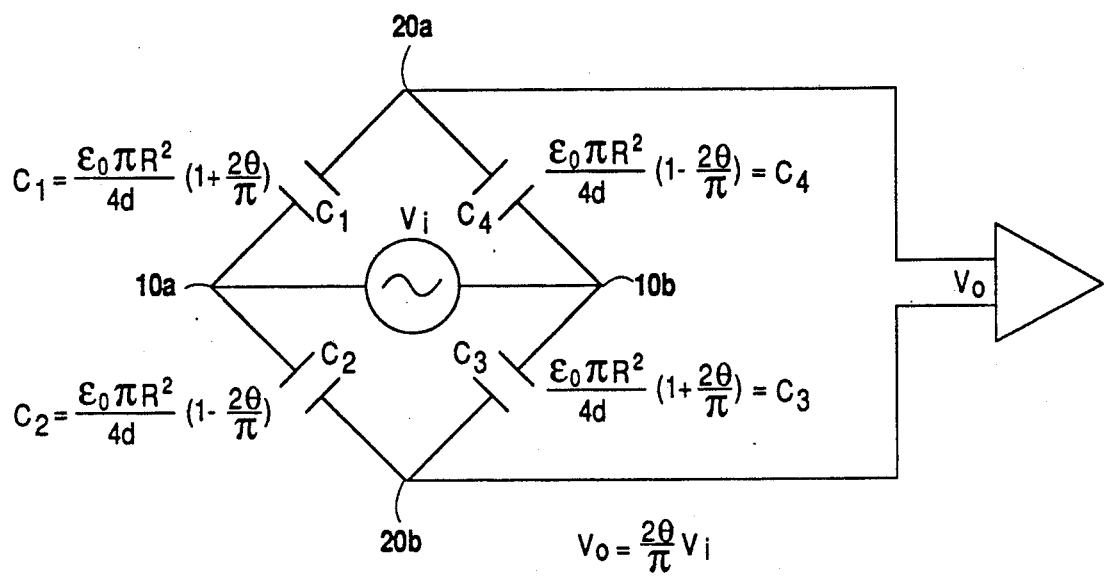
FIG. 2 is a schematic of the equivalent bridge circuit of the transducer.

When the rotor 4 is displaced with respect to the stator 5, the capacitance derived from the four semicircular conducting plates are changed according to the variations in area. Apart from stray capacitances, such as across the insulator gaps (i.e., edge to edge of the plates) the capacitance changes are a linear function of the angular displacement, $\theta$, from nominal equilibrium as shown in FIG. 2. For the case shown, no dielectric material is placed between the plates, although some applications may want to do so. The linearity of the detector is a consequence of the fact that (i) the capacitance of an ideal parallel plate capacitor is proportional to the area between its plates, and (ii) the area between plates is proportional to $\theta$.

The capacitance of two parallel plates is dependent upon the area of either plate which directly faces the corresponding area of the other plate. Thus, when $\theta$ is equal to zero (i.e., when the insulating strips 10c and 20c are perpendicular) a parallel plate capacitance $C_1$ exists between semicircular rotor plate 10a and semicircular stator plate 20a with an effective area equal to one-half of the total semicircular plate area. A capacitance $C_2$ also exists between semicircular rotor plate 10a and semicircular stator plate 20b which is of the same magnitude when $\theta$ equals zero. Similar capacitances $C_3$ and $C_4$ exist between plate 10b and plate 20b and between plate 10b and plate 20a. Thus, the equivalent circuit is as shown in FIG. 2 with $\theta=0$.

The idealized capacitance of an air gap parallel plate capacitor is approximately equal to:

$$C = \frac{\epsilon_0 A}{d}$$

where A is the area of directly opposing surfaces, d is the distance between the plates, and $\epsilon_0$ is permittivity of free space. Therefore, when $\theta$ is equal to zero, the effective area for each capacitance is equal to half of each semicircular plate area:

$$C_1 = C_2 = C_3 = C_4 = \frac{\epsilon_0 \pi R^2}{4d}$$

When $\theta$ is varied, the effective area for each of the four capacitances is either increased or decreased as follows:

$$C_1 = \frac{\epsilon_0 \pi R^2}{4d} \left( 1 + \frac{2\theta}{\pi} \right)$$

$$C_2 = \frac{\epsilon_0 \pi R^2}{4d} \left( 1 - \frac{2\theta}{\pi} \right)$$

$$C_3 = \frac{\epsilon_0 \pi R^2}{4d} \left( 1 + \frac{2\theta}{\pi} \right)$$

$$C_4 = \frac{\epsilon_0 \pi R^2}{4d} \left( 1 - \frac{2\theta}{\pi} \right)$$

This assumes that stray capacitances are ignorable. If, additionally, the input impedance of the differential amplifier is large compared to the output reactance of the bridge, the following equation applies.

$$v_0 = \frac{2\theta}{\pi} v_i, \quad -\pi/2 \leq \theta \leq \pi/2 \tag{1}$$

where $v_i$ is the bridge excitation voltage, and $v_o$ is the output from the transducer. It should be noted that Eq. 1 is true only if synchronous detection is employed. If a null detector were used, instead, then $\theta$ in the equation would have to be replaced by its absolute value.

Figure 3:
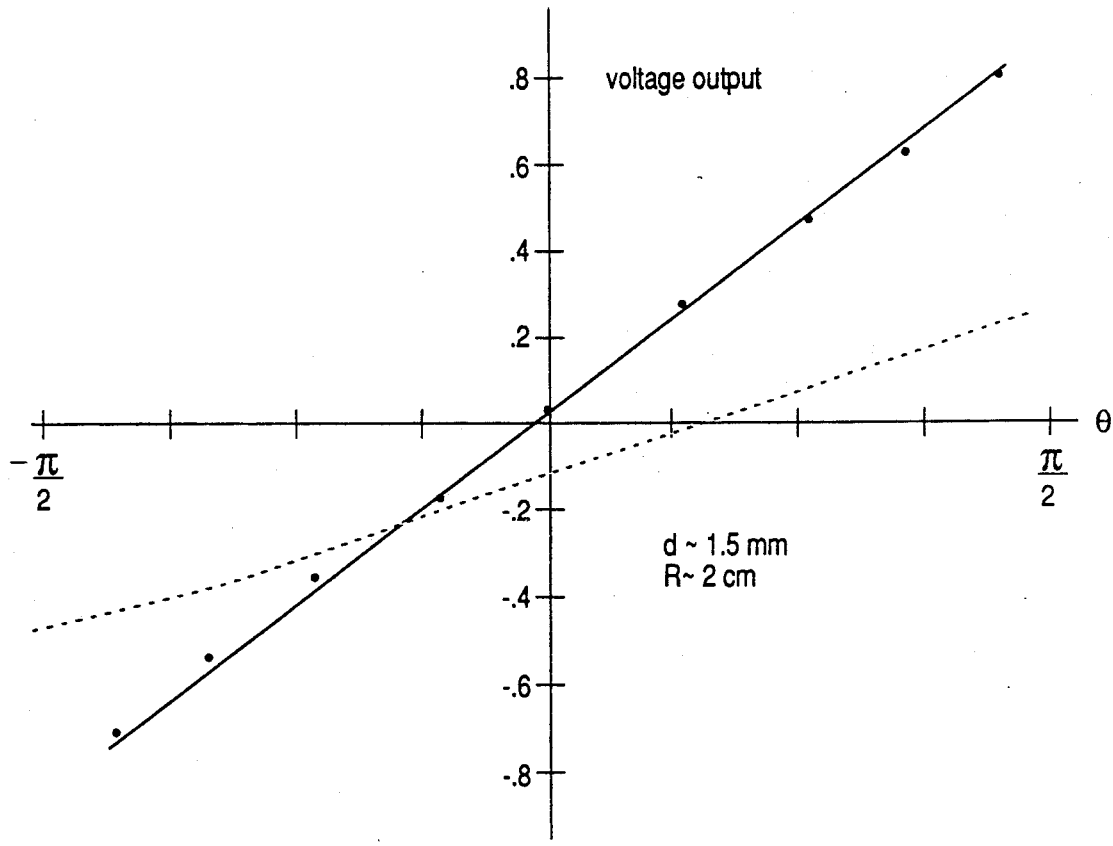
FIG. 3 shows the results of a test conducted with a prototype of a transducer constructed in accordance with the present invention.

The basic transducer (defined to have an integral synchronous detector) is completely linear between $-\pi/2$ and $\pi/2$ in the absence of stray capacitance, if the plates are maintained parallel during rotation. FIG. 3 verifies the predicted linearity using a prototype which was not carefully constructed. The dashed curve shows that, even with severe misalignment, the unit could still be of use for some applications. The data for FIG. 3 was collected with a lock-in amplifier whose internal sine wave reference was used to drive the transducer. The node point 10b of FIG. 2 was at ground potential (unbalanced drive) for these measurements. This causes the capacitance to ground of each of the differential amplifier inputs ($C_A$) to be parallel respectively with $C_3$ and $C_4$. Consequently, the output the bridge is reduced, and Eq. 1 becomes, for the unbalanced drive:

$$v_0 = \frac{2\theta}{\pi} v_i \left( 1 + \frac{2C_A d}{\epsilon_0 \pi R^2} \right)^{-1} \tag{1b}$$

Thus it is seen that an unbalanced drive can be used, but the output is attenuated unless the input capacitance of the differential amplifier is small compared to $\epsilon_0 \pi R2/(2D)$.

Figure 4:
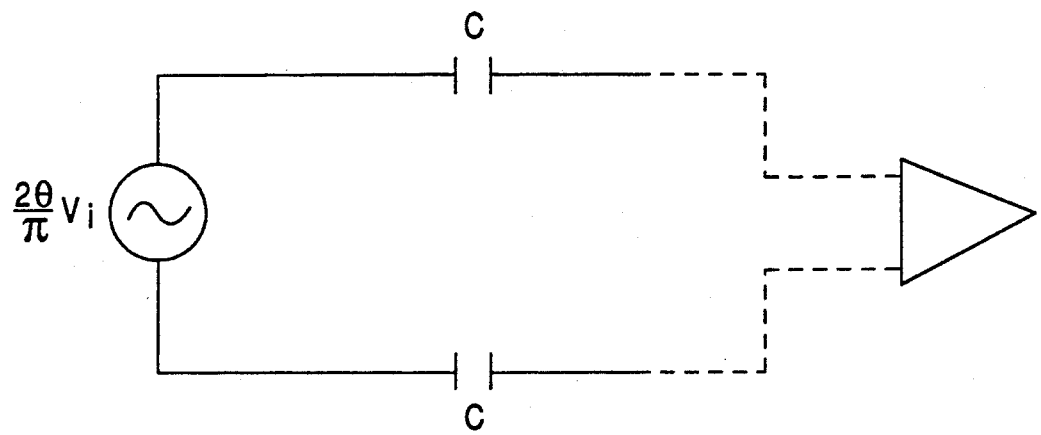
FIG. 4 is a schematic of the output equivalent circuit of the basic transducer (no capacitance pick-up).

The Thevenin output equivalent circuit of the transducer is readily obtained, as shown in FIG. 4. It is seen that the input impedance of the differential amplifier must be large compared with $1/(\omega C)$ if the output signal is not to be significantly attenuated. For such an amplifier, the input impedance seen by the bridge source is a variable capacitance $$C_v = \frac{\epsilon_0 \pi R^2}{4d} \left( 1 - \frac{4\theta^2}{\pi^2} \right) \tag{2}$$

If the signal, $v_i$, is not to be attenuated, then the output impedance of the bridge source must be small compared to $1/(\omega C_v)$. This is no problem for frequencies in the range of 50 kHz, since $1/(\omega C_v)$ is then typically about a megohm.

Energy is stored in charged capacitors. The amount in the present transducer was found to be $$W = \frac{\epsilon_0 \pi R^2}{8d} <v_i^2> \left( 1 - \frac{4\theta^2}{\pi^2} \right) \tag{3}$$

where $<v2_i>$ is the mean square bridge excitation voltage. The dependence of W on $\theta$ means that there is an electrical restoring constant $$k_{e1} = \frac{\epsilon_0 R^2}{\pi d} <v_i^2> \tag{4}$$

One application of the transducer is that for which torsional pendulum angle displacement is measured. If the restoring constant of the torsional pendulum fiber is very small (such as with the Cavendish apparatus), $k_{e1}$ could become significant. This could, in fact, be a way to provide variable restoration by means of drive voltage adjustment.

There are many places in applied physics where one would like to detect rotational displacements with a sensitive linear detector. One application of the present transducer has already been alluded to —that of a torsional pendulum. The resulting gauge will be used for measuring momentum transfer and mass loss that occur when a solid target is radiated by a high-power laser. To determine the temporal characteristics of the signal that is driving the gauge, it is necessary to correct for sensor and electronics contributions to the waveform. This is a deconvolution process and is straight-forward only if every element of the system is linear. The linearity of the present transducer is thus very important to data processing. FIG. 5 illustrates the use of the transducer with such a torsional pendulum. The measurements data were obtained by means of a General Purpose Interface Bus (GPIB IEEE 488 standard) digital system. As indicated by the initial conditions, the pendulum was released from rest with an initial angular displacement, $-\theta_o$. The waveform shows the influence of electronics filtering that may be of too long a time constant for some purposes. The pendulum period was 0.6 second. The time constant of the electronics low-pass filter (part of the lock-in amplifier) was 0.4 second. The significance of this 0.4 second is evident when one compares the measurements with the simulation of the pure pendulum, also shown. The pure pendulum response results when the low pass filter response (0.4 sec time constant) is removed by deconvolution.

A modification to the device as described above may be made for applications in which wire attachments to the rotor are unacceptable. An example would be when the device is used with a Cavendish balance to measure the universal gravitational constant. If wires are attached to the rotor, the wires perturb the restoring torque from the balance's fiber in an unacceptable manner. In these types of applications, a capacitance pick-up plate is used in lieu of wires to sense the voltage from the rotor and feed it to the differential amplifier. The rotor is then free to move with no mechanical perturbations.

Figure 7:
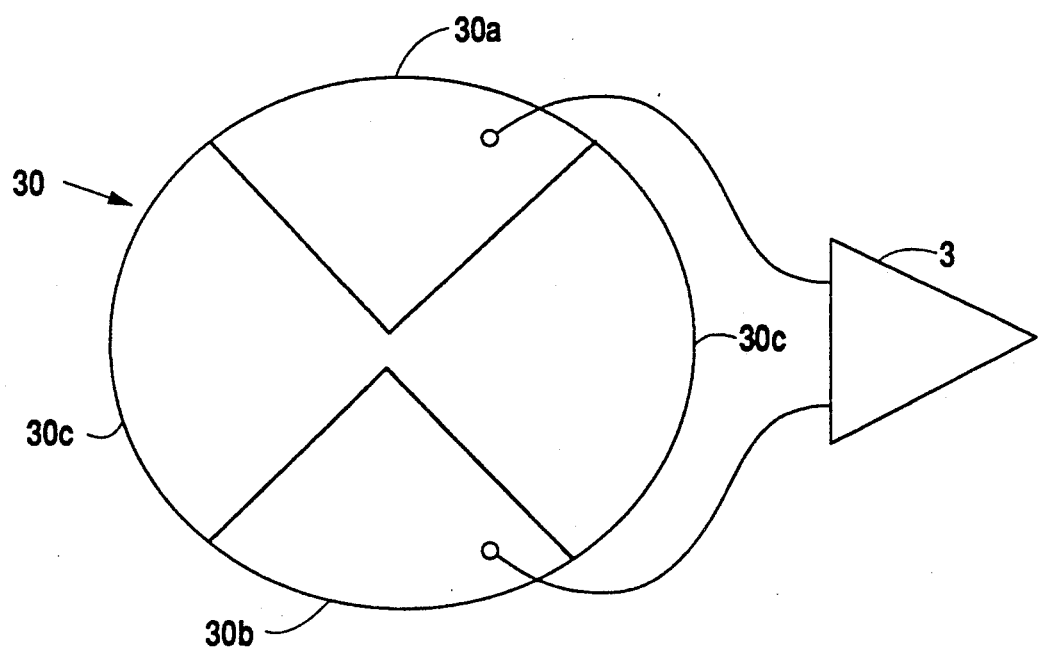
FIG. 7 shows an exemplary capacitance pick-up plate.
Figure 6:
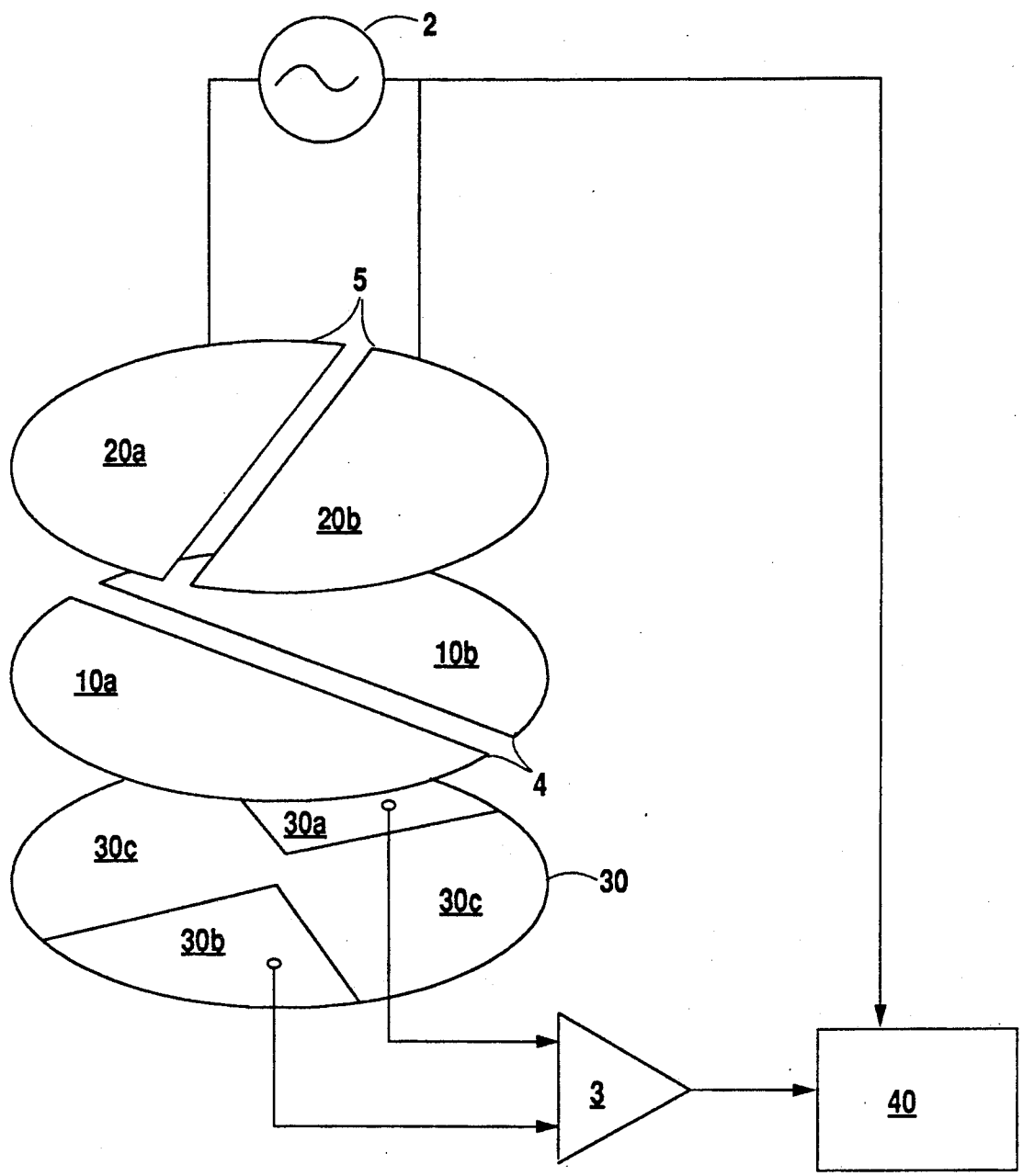
FIG. 6 is a schematic of the transducer with a capacitance pick-up plate.

As shown in FIGS. 6 and 7, the capacitance pick-up plate 30 comprises two conductive quarter-sections 30a and 30b oriented 180 degrees apart and separated by insulating material 30c. When the pick-up plate 30 is positioned as in FIG. 6, the conductive sections 30a and 30b will always oppose conductive rotor plates 10a and 10b, respectively, only for a range of $\theta$ from $-\pi/4$ to $+\pi/4$. Therefore, the range of linearity for the modification is reduced. Also, the sensitivity is reduced by a factor of about two. Various other shapes of a capacitance pick-up could be used in accordance with the present invention, but that shown in FIG. 7 represents a trade-off between sensitivity and range of linearity.

Although the invention has been described in conjunction with the foregoing specific embodiments, many alternatives, variations, and modifications are apparent to those of ordinary skill in the art. Those alternatives, variations, and modifications are intended to fall within the scope and spirit of the appended claims.

What is claimed is:

1. A rotary differential capacitance transducer, comprising:
    a circular stator comprising two semicircular conductive plates separated by an insulating strip and being rigidly mounted to a frame;
    a circular rotor comprising two semicircular conductive plates separated by an insulating strip, rotatably and coaxially mounted in proximity to the stator so that the stator and rotor are separated by a constant spacing, the stator and rotor together forming a bridge-type capacitance network;
    a voltage excitation source for applying an A.C. voltage across the conductive plates of the stator;
    a differential amplifier for measuring the potential difference between the conductive plates of the rotor, which drives a synchronous detector whose reference is provided by the excitation source and whose output voltage is proportional to the degree of rotation of the rotor.

2. The transducer as set forth in claim 1 wherein the inputs to the differential amplifier are by means of wires to the conductive plates of the rotor.

3. The transducer as set forth in claim 1 further comprising:
    a capacitance pick-up plate comprising two conductive sections separated by insulating material, non-rotatably and coaxially mounted in proximity to the rotor, wherein over a certain range of rotation of the rotor the potential difference between the two conductive sections of the pick-up plate varies as the potential difference between the two semicircular conductive plates of the rotor, the inputs to the differential amplifier being connected by wires to the conductive sections of the pick-up plate.

4. The transducer as set forth in claim 3 wherein the capacitance pick-up plate is circular in shape having two oppositely oriented quarter sections of conductive material separated by insulating material.

* * * * *